United States Patent [19]

Bruff et al.

[11] Patent Number: 4,527,329
[45] Date of Patent: Jul. 9, 1985

[54] PROCESS FOR THE MANUFACTURE "IN SITU" OF CARBON ELECTRODES

[75] Inventors: William Bruff, Vaagsbygd, Norway; Geraldo S. de Santana; David G. de Oliveira, both of Espiritio Santo, Brazil

[73] Assignees: Carboindustrial S.A., Brazil; Elkem a/s, Norway

[21] Appl. No.: 397,574

[22] Filed: Jul. 12, 1982

Related U.S. Application Data

[63] Continuation-in-part of Ser. No. 330,446, Dec. 14, 1981, abandoned, which is a continuation of Ser. No. 217,393, Dec. 15, 1980, abandoned, which is a continuation of Ser. No. 89,492, Oct. 30, 1979, abandoned.

[30] Foreign Application Priority Data

Oct. 31, 1978 [BR] Brazil ................................. 7807158

[51] Int. Cl.³ ............................................ H01R 43/00
[52] U.S. Cl. ........................................ 29/825; 373/89
[58] Field of Search ................... 29/825; 373/89, 97, 373/99; 219/137.2

[56] References Cited

U.S. PATENT DOCUMENTS

| | | | |
|---|---|---|---|
| 1,440,724 | 1/1923 | Soderberg | 373/89 |
| 1,544,151 | 6/1925 | Helfenstein | 373/99 X |
| 2,495,148 | 1/1950 | Tanberg | 373/89 X |
| 4,133,968 | 1/1979 | Frolov | 373/89 |
| 4,447,703 | 5/1984 | Stol | 219/137.2 X |

FOREIGN PATENT DOCUMENTS

| | | | |
|---|---|---|---|
| 673945 | 1/1930 | France . | |
| 116853 | 1/1918 | United Kingdom . | |
| 924842 | 5/1963 | United Kingdom | 373/97 |
| 1269676 | 4/1972 | United Kingdom . | |

Primary Examiner—Mark Rosenbaum
Assistant Examiner—Carl J. Arbes
Attorney, Agent, or Firm—Lucas & Just

[57] ABSTRACT

A process of forming a continuous carbon electrode for use in a smelting furnace in situ is disclosed. The process consists of at least two annular members, the first annular member provides the heat for softening, and baking the electrode paste to form a solid carbon electrode and the second annular member provides the electric current for the furnace. The second annular member receives energy independent of the first annular member. The weight of the electrode is supported either by the first annular member or by a third annular member which is added between the first two annular members.

3 Claims, 2 Drawing Figures

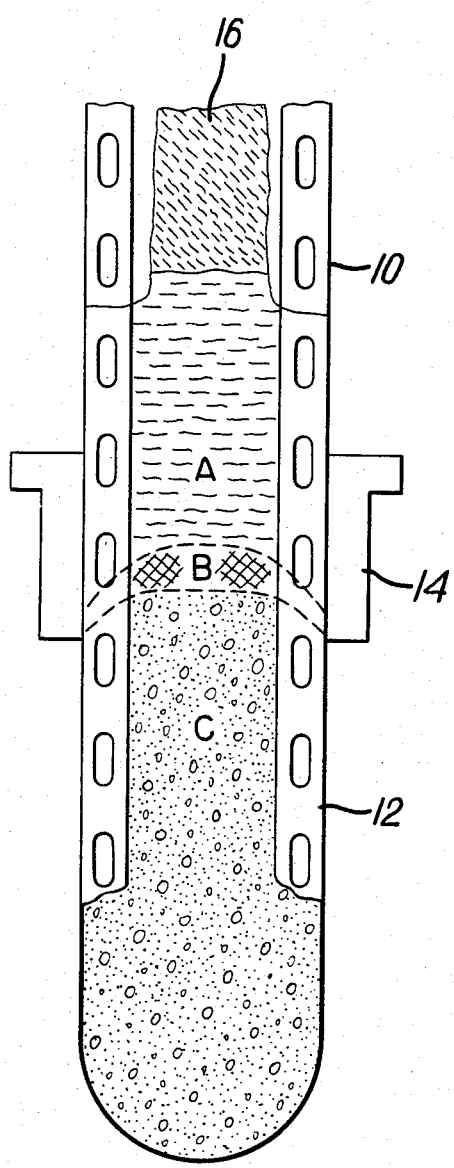
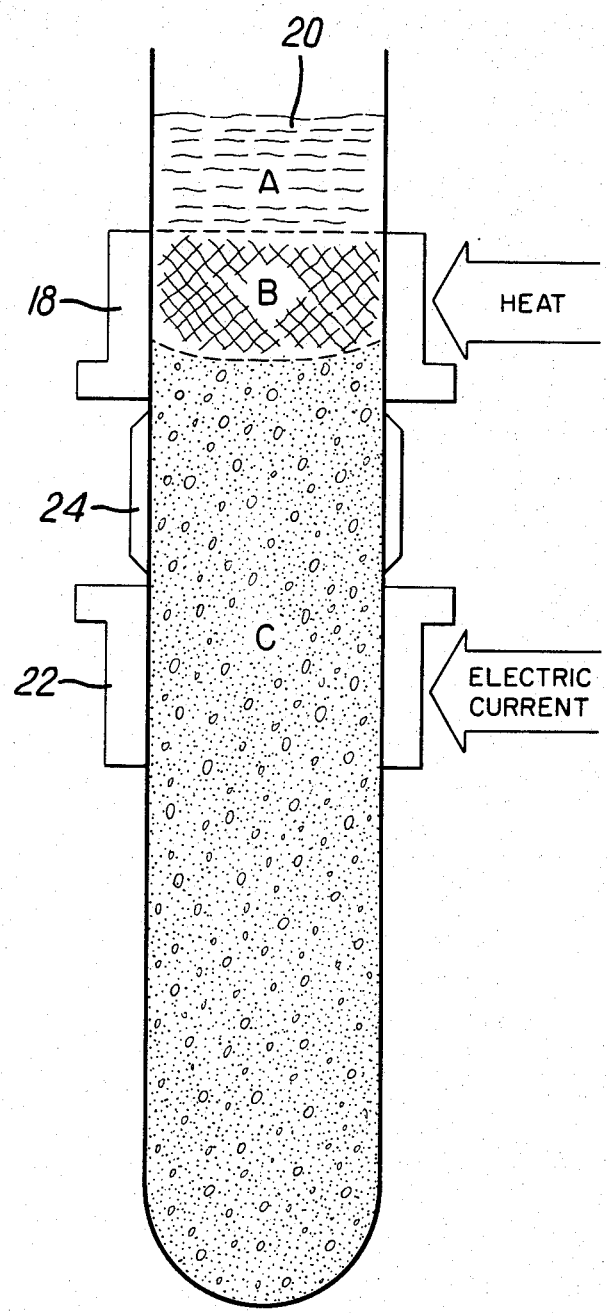
FIG. 1
PRIOR ART
FIG. 2

PROCESS FOR THE MANUFACTURE "IN SITU" OF CARBON ELECTRODES

This application is a continuation-in-part of application Ser. No. 330,446 filed Dec. 14, 1981 and now abandoned which in turn was a continuation of application Ser. No. 217,393 filed Dec. 15, 1980 and now abandoned which in turn was a continuation of application Ser. No. 089,492 filed Oct. 30, 1979 and now abandoned.

The invention relates to an improved process for the manufacture of electrodes in situ, and more particularly to an improved process of formation of a carbon electrode in the upper parts of electro-metallurgical furnaces.

The Soederberg process for formation of carbon electrodes in situ in electric furnaces is very well known. In general, the Soederberg process overcomes the need for manufacture of electrodes in a separate manufacturing facility by enabling the production of the electrode in situ from an electrode paste of carbon, for example, a mixture of anthracite and a hydrocarbon binder such as pitch and/or tar.

The Soederberg electrodes in electrothermic furnaces are typically equipped with a consumable casing which follows the downward movement of the electrode into the charge. Other Soederberg electrodes are conventionally equipped with a fixed casing through which a formed carbon electrode is supplied. In either case, the electric current is supplied to the entire casing or mantle of the electrode both for baking the electrode paste as it progresses downward toward the charge and for supplying operating current to the electrode.

The Soederberg process is a preferred process for forming furnace electrodes. Unfortunately, the suspension and advance of the conventional electrode requires complicated and expensive suspension design and apparatus for lowering the electrode as well as an elaborate cooling system, all of which must be included within a restricted space of the furnace.

U.S. Pat. No. 1,544,151 teaches an apparatus for forming electrodes by molding a separate electrode section directly above and joined to the operating electrode. Each successive electrode portion is manufactured in place by tamping the electrode material into a mold disposed above the operating electrode, heating the new material to form a new electrode portion which is separable from but affixed to the lower electrode and then allowing the newly baked electrode portion to cool in order to separate the electrode from the walls of the mold. The process taught by this reference is not a truly continuous process in that each unit of the electrode is formed separately as a unit to be added as a section to the lower electrode. The electrode itself is thus not a truly continuous electrode and differs from previously known electrode design only in the location of the electrode-forming mold, since the teaching of this reference is that the units to be added are joined by means of pieces of metal or graphite in precisely the same way as the conventional pre-baked carbon electrodes are joined.

An object of this invention is an improved process which will permit the use of a Soederberg type electrode is submerged arc furnaces as well as in arc furnaces. Another object is to make possible the use of a continuous electrode-forming process in systems especially where the product might be contaminated by the material of the casing.

In accordance with the invention a continuous electrode is obtained by the process of softening and baking an electrode paste in a relatively small first zone adjacent to a first annular member which provides for controllable heating and baking of the electrode paste. It has been found that an electrode formed as disclosed herein emerges from the annular member without requiring a casing or surrounding shell for mechanical support or for electrical conduction. The baked electrode advances from the first annular member to a separate holder for supplying electric current to the electrode in a second zone thereof.

Other objectives and advantages of the method and electrode in accordance with the invention will be appreciated from the following description of the drawings herein:

FIG. 1 is a schematic longitudinal section of an electrode of the conventional Soederberg process; and FIG. 2 is a schematic view of a longitudinal section of an electrode in accordance with the present invention.

Referring now to FIG. 1, it can be seen that a conventional Soederberg electrode includes a casing 10 having a plurality of ribs 12 disposed along its internal periphery. An electrode holder 14 for supplying current to the electrode surrounds the casing 10.

Electrode paste 16 which is, for example, a conventional mixture of calcined anthracite and pitch and/or tar is supplied within the casing 10. As the electrode is lowered, the mixture 16 approaches the zone A which is typically situated just above the holder 14. Conventional electrode pastes soften at approximately 80° C. and when the temperature reaches the range of from about 400° C. to about 600° C., the volatile substances in the paste are expelled and the paste is baked into a final form. Thus, as the temperature of the paste in the casing reaches the neighborhood of approximately 80° C., the softened paste slides downward to fill the casing and is subjected in the area illustrated as zone B to increasing temperatures of approximately 400° C. to 600° C. where it is baked. At this point, there is thus formed a solid carbon electrode C encased at the periphery by the casing 10 which will also enter the furnace interior where it will be consumed. In this known continuous process, new casing will be required to be added at the upper end to in turn be lowered and consumed.

FIG. 2 illustrates in schematic form both the process of making an electrode and an electrode according to the invention. Electrode paste 20, which suitably may be a known mixture of calcined anthracite and pitch and/or tar is fed into the upper opening of annular member 18. Controllable heat is applied through member 18 to the paste mixture 20 therein. As in the previous described process, the softening of the paste takes place at approximately 80° C. and the baking in the range of approximately 400° C. to 600° C., which temperature is provided in any conventional manner to the member 18. For best results, the heating for the softening and baking of the electrode paste is independent of the energy utilized for the melting process in the electric furnace.

It will be appreciated by those skilled in the art that any known controllable heating means are suitable for the purpose of providing heat to the member 18. The means can include electric resistance heating, induction heating, open or closed flame heating, or a heat exchanging apparatus, each of which may be easily adjusted.

The heat is adjusted so that by the time that the paste has traveled through zone B, the paste has been heated to temperatures of about 1000° C. and thereby baked sufficiently such that the lower portion of electrode C is substantial enough to be fed to and held by separate holder 22 without requiring the surrounding casing taught in the prior art, which casing would also normally carry the operating electric current for the electro-thermal furnace operation.

It will be appreciated that the member 18 may conveniently be made sufficiently strong itself to enable it to carry at least a part of the electrode weight. However, the suspension of the electrode could also be effected by a separate holder 24 shown disposed between members 18 and 22. The electrode may be utilized in horizontal or inclined positions as well as the typical vertical position.

It will be further appreciated that the process in accordance with the invention will not preclude the use of, if desired, a simplified casing in which the ribs 12 of casing 10 are eliminated entirely in order to reduce manufacturing costs of such casings.

It will also be appreciated that feeding of the electrode paste may be accomplished by well known mechanical means (not shown) or by tamping means (also not shown).

It will be understood that the claims are intended to cover all changes and modifications of the embodiment herein shown for the purpose of illustration which do not depart from the scope and spirit of the invention.

What is claimed is:

1. A process for continuously forming in situ a carbon electrode in at least one annular member and a spaced separate electrode holder for use in a smelting furnace comprising the steps of:
    (a) supplying electrode paste consisting essentially of carbonaceous material and a hydrocarbon binder to said annular member;
    (b) supplying heat to said electrode paste in said annular holder and controlling the supply of heat to said electrode paste in said annular member, independently of the heat of said smelting furnace, said heat being sufficient for softening and heating the electrode paste to a temperature of at least about 400° C. to bake the electrode paste and form a solid unitary carbon electrode while said electrode paste is within said annular member; and
    (c) advancing the solid unitary electrode from said annular member to said holder, said spaced separate holder being operative for suspending the electrode and for receiving electrical current and supplying the current to the electrode independently of energy supplied to the annular member, whereby the solid electrode is a continuous unitary mass between said annular member and said separate holder.

2. The process of claim 1 which includes the step of supplying heat to said electrode paste in said annular holder independently of the energy utilized for the melting process in said electric smelting furnace.

3. The process of claim 1 which includes the steps of heating the annular member and transferring the heat for softening and baking the electrode paste from said annular member to the electrode paste by means of physical contact between the annular member and electrode paste.

* * * * *